US012689661B2

(12) United States Patent
Shachar et al.

(10) Patent No.: US 12,689,661 B2
(45) Date of Patent: Jul. 21, 2026

(54) GENERATION OF ACTIVITY PROFILES LIMITING UTILIZATION OF INFORMATION TECHNOLOGY ASSETS

(71) Applicant: Dell Products L.P., Round Rock, TX (US)

(72) Inventors: Tomer Shachar, Beer-Sheva (IL); Yevgeni Gehtman, Modi'in (IL); Ophir Buchman, Raanana (IL)

(73) Assignee: Dell Products L.P., Round Rock, TX (US)

( * ) Notice: Subject to any disclaimer, the term of this patent is extended or adjusted under 35 U.S.C. 154(b) by 73 days.

(21) Appl. No.: 18/656,040

(22) Filed: May 6, 2024

(65) Prior Publication Data

US 2025/0343822 A1     Nov. 6, 2025

(51) Int. Cl.
*H04L 9/40* (2022.01)
*H04L 67/50* (2022.01)

(52) U.S. Cl.
CPC ............ *H04L 63/20* (2013.01); *H04L 67/535* (2022.05)

(58) Field of Classification Search
CPC ... H04L 63/20; H04L 63/0227; H04L 67/535; H04L 43/00; G06F 11/34
USPC .......................................................... 726/1
See application file for complete search history.

(56) References Cited

U.S. PATENT DOCUMENTS

| | | | | | |
|---|---|---|---|---|---|
| 10,192,246 B2 * | 1/2019 | Morgan | .................. | G06Q 30/04 |
| 2010/0158374 A1 * | 6/2010 | Anand | ................. | H04N 1/4406 |
| | | | | | 382/173 |

| | | | | | |
|---|---|---|---|---|---|
| 2012/0203895 A1 * | 8/2012 | Jaudon | ................ | G06F 11/3438 |
| | | | | | 709/224 |
| 2014/0258446 A1 * | 9/2014 | Bursell | ............... | G06F 9/45558 |
| | | | | | 709/217 |
| 2015/0100801 A1 * | 4/2015 | Maity | ................... | G06F 1/3231 |
| | | | | | 713/320 |
| 2018/0027506 A1 * | 1/2018 | Pasulka | ............... | H04W 72/541 |
| | | | | | 370/338 |

(Continued)

OTHER PUBLICATIONS

Phyo, et al.; "A Framework for Monitoring Insider Misuse of IT Applications"; University of Plymouth Drake Circus, Plymouth, Devon, United Kingdom; downloaded Apr. 23, 2024.

(Continued)

*Primary Examiner* — Kaylee J Huang
(74) *Attorney, Agent, or Firm* — Ryan, Mason & Lewis, LLP

(57) ABSTRACT

Techniques are provided for generation of activity profiles limiting utilization of information technology (IT) assets. One method comprises monitoring users interacting with IT assets to obtain logged data; determining a threshold based on a designated restriction level for the IT assets; processing the logged data based on a data type to automatically generate an activity profile characterizing limitations related to a utilization of at least one of the IT assets, where the limitations are determined by applying the threshold to a representation of the logged data; and initiating an automated action to automatically control access to the at least one IT asset based on the activity profile. The activity profile may comprise a requester activity profile where the monitored users may be selected based on a role, user persona and/or a type; and/or an application activity profile where the monitored users use an application for a designated period of time.

20 Claims, 11 Drawing Sheets

(56) References Cited

U.S. PATENT DOCUMENTS

| | | | | |
|---|---|---|---|---|
| 2019/0311067 A1* | 10/2019 | Waye | .................... | G06F 16/634 |
| 2019/0349344 A1* | 11/2019 | Thomas | ................ | H04W 12/63 |
| 2020/0358780 A1* | 11/2020 | Anbalagan | ............ | H04L 63/102 |
| 2021/0127150 A1* | 4/2021 | Alagarsamy | .......... | H04L 67/131 |

OTHER PUBLICATIONS

"INCITS Announces ANSI's Approval of Role Based Access Control (RBAC) Security Standard"; Online Resource for Markup Language Technologies; Apr. 4, 2004.
U.S. Appl. No. 18/488,537, filed Oct. 17, 2023, entitled "Enforcing Limits on Use of Endpoint Devices.".

* cited by examiner

Figure 3:
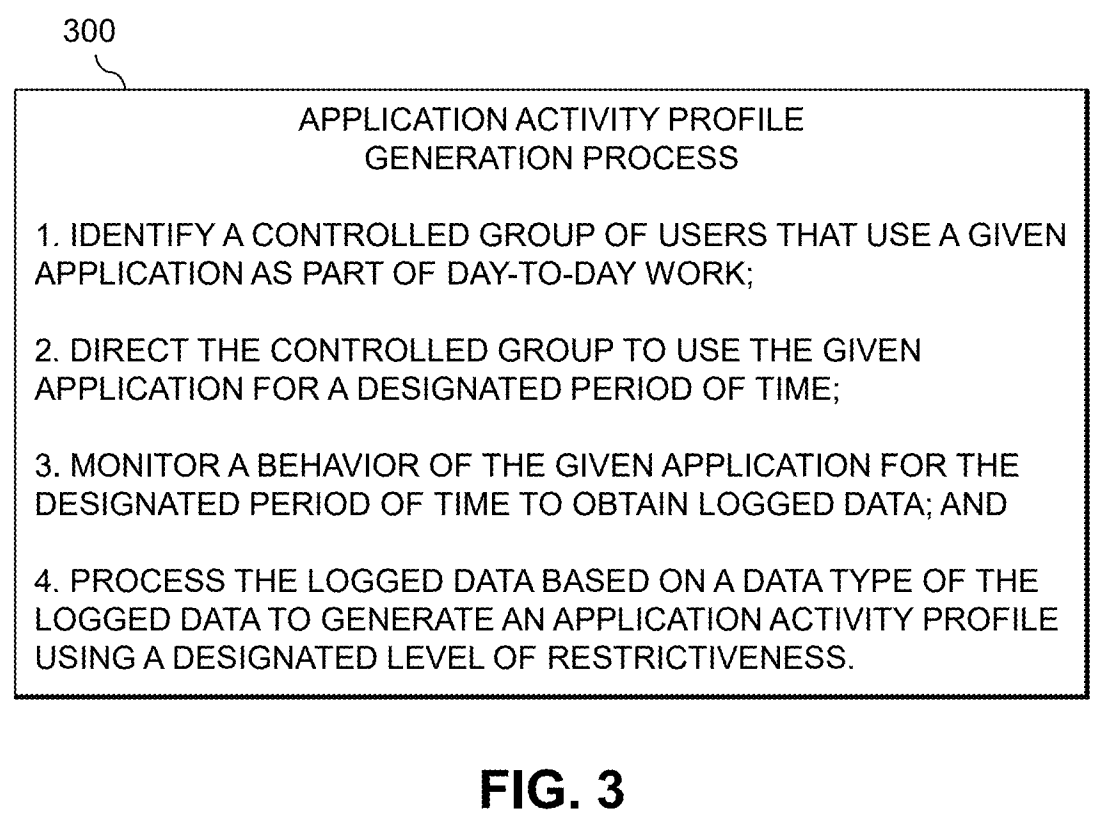

300

APPLICATION ACTIVITY PROFILE GENERATION PROCESS

1. IDENTIFY A CONTROLLED GROUP OF USERS THAT USE A GIVEN APPLICATION AS PART OF DAY-TO-DAY WORK;

2. DIRECT THE CONTROLLED GROUP TO USE THE GIVEN APPLICATION FOR A DESIGNATED PERIOD OF TIME;

3. MONITOR A BEHAVIOR OF THE GIVEN APPLICATION FOR THE DESIGNATED PERIOD OF TIME TO OBTAIN LOGGED DATA; AND

4. PROCESS THE LOGGED DATA BASED ON A DATA TYPE OF THE LOGGED DATA TO GENERATE AN APPLICATION ACTIVITY PROFILE USING A DESIGNATED LEVEL OF RESTRICTIVENESS.

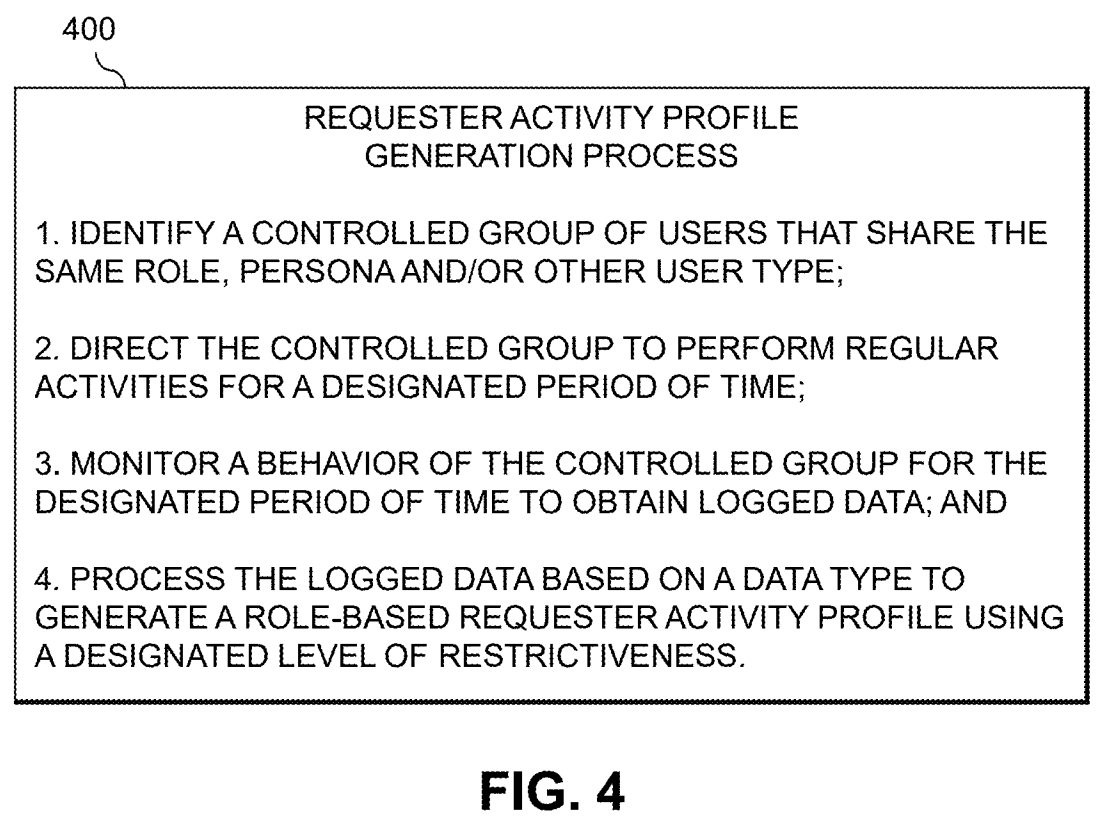

REQUESTER ACTIVITY PROFILE
GENERATION PROCESS

1. IDENTIFY A CONTROLLED GROUP OF USERS THAT SHARE THE
SAME ROLE, PERSONA AND/OR OTHER USER TYPE;

2. DIRECT THE CONTROLLED GROUP TO PERFORM REGULAR
ACTIVITIES FOR A DESIGNATED PERIOD OF TIME;

3. MONITOR A BEHAVIOR OF THE CONTROLLED GROUP FOR THE
DESIGNATED PERIOD OF TIME TO OBTAIN LOGGED DATA; AND

4. PROCESS THE LOGGED DATA BASED ON A DATA TYPE TO
GENERATE A ROLE-BASED REQUESTER ACTIVITY PROFILE USING
A DESIGNATED LEVEL OF RESTRICTIVENESS.

FIG. 4

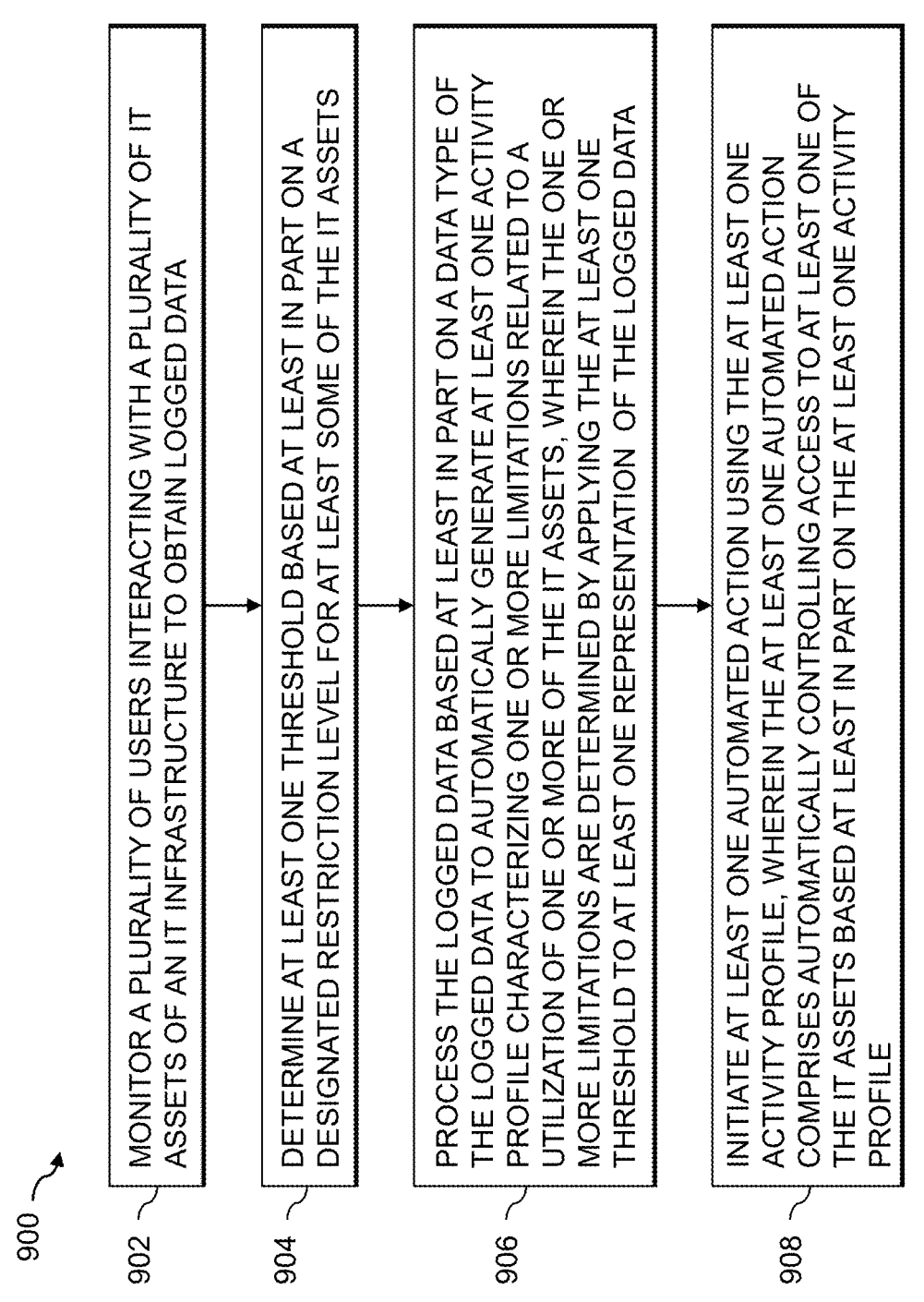

900

902  MONITOR A PLURALITY OF USERS INTERACTING WITH A PLURALITY OF IT ASSETS OF AN IT INFRASTRUCTURE TO OBTAIN LOGGED DATA

904  DETERMINE AT LEAST ONE THRESHOLD BASED AT LEAST IN PART ON A DESIGNATED RESTRICTION LEVEL FOR AT LEAST SOME OF THE IT ASSETS

906  PROCESS THE LOGGED DATA BASED AT LEAST IN PART ON A DATA TYPE OF THE LOGGED DATA TO AUTOMATICALLY GENERATE AT LEAST ONE ACTIVITY PROFILE CHARACTERIZING ONE OR MORE LIMITATIONS RELATED TO A UTILIZATION OF ONE OR MORE OF THE IT ASSETS, WHEREIN THE ONE OR MORE LIMITATIONS ARE DETERMINED BY APPLYING THE AT LEAST ONE THRESHOLD TO AT LEAST ONE REPRESENTATION OF THE LOGGED DATA

908  INITIATE AT LEAST ONE AUTOMATED ACTION USING THE AT LEAST ONE ACTIVITY PROFILE, WHEREIN THE AT LEAST ONE AUTOMATED ACTION COMPRISES AUTOMATICALLY CONTROLLING ACCESS TO AT LEAST ONE OF THE IT ASSETS BASED AT LEAST IN PART ON THE AT LEAST ONE ACTIVITY PROFILE

FIG. 9

GENERATION OF ACTIVITY PROFILES LIMITING UTILIZATION OF INFORMATION TECHNOLOGY ASSETS

BACKGROUND

Information processing systems include a wide variety of information technology (IT) assets that execute software applications, for example. It is often necessary to manage a utilization of such IT assets, such as controlling access to resources associated with such IT assets, by entities such as users and software applications.

SUMMARY

Illustrative embodiments of the disclosure provide techniques for processing of log data to automatically generate activity profiles and controlling access to one or more IT assets based at least in part on the generated activity profiles. One method includes monitoring a plurality of users interacting with a plurality of IT assets of an IT infrastructure to obtain logged data; determining at least one threshold based at least in part on a designated restriction level for at least some of the IT assets; processing the logged data based at least in part on a data type of the logged data to automatically generate at least one activity profile characterizing one or more limitations related to a utilization of one or more of the IT assets, wherein the one or more limitations are determined by applying the at least one threshold to at least one representation of the logged data; and initiating at least one automated action using the at least one activity profile, wherein the at least one automated action comprises automatically controlling access to at least one of the IT assets based at least in part on the at least one activity profile.

Illustrative embodiments can provide significant advantages relative to conventional techniques. For example, technical problems associated with such conventional techniques are mitigated in one or more embodiments by automatically generating activity profiles characterizing limitations related to a utilization of one or more IT assets.

Other illustrative embodiments include, without limitation, apparatus, systems, methods and computer program products comprising processor-readable storage media.

BRIEF DESCRIPTION OF THE DRAWINGS

FIG. 3 is a process diagram illustrating an application activity profile generation process in accordance with an illustrative embodiment;

FIG. 4 is a process diagram illustrating a requester activity profile generation process in accordance with an illustrative embodiment;

FIG. 9 is a flow diagram illustrating an exemplary implementation of a generation of activity profiles limiting utilization of IT assets in accordance with an illustrative embodiment;

DETAILED DESCRIPTION

Figure 1:
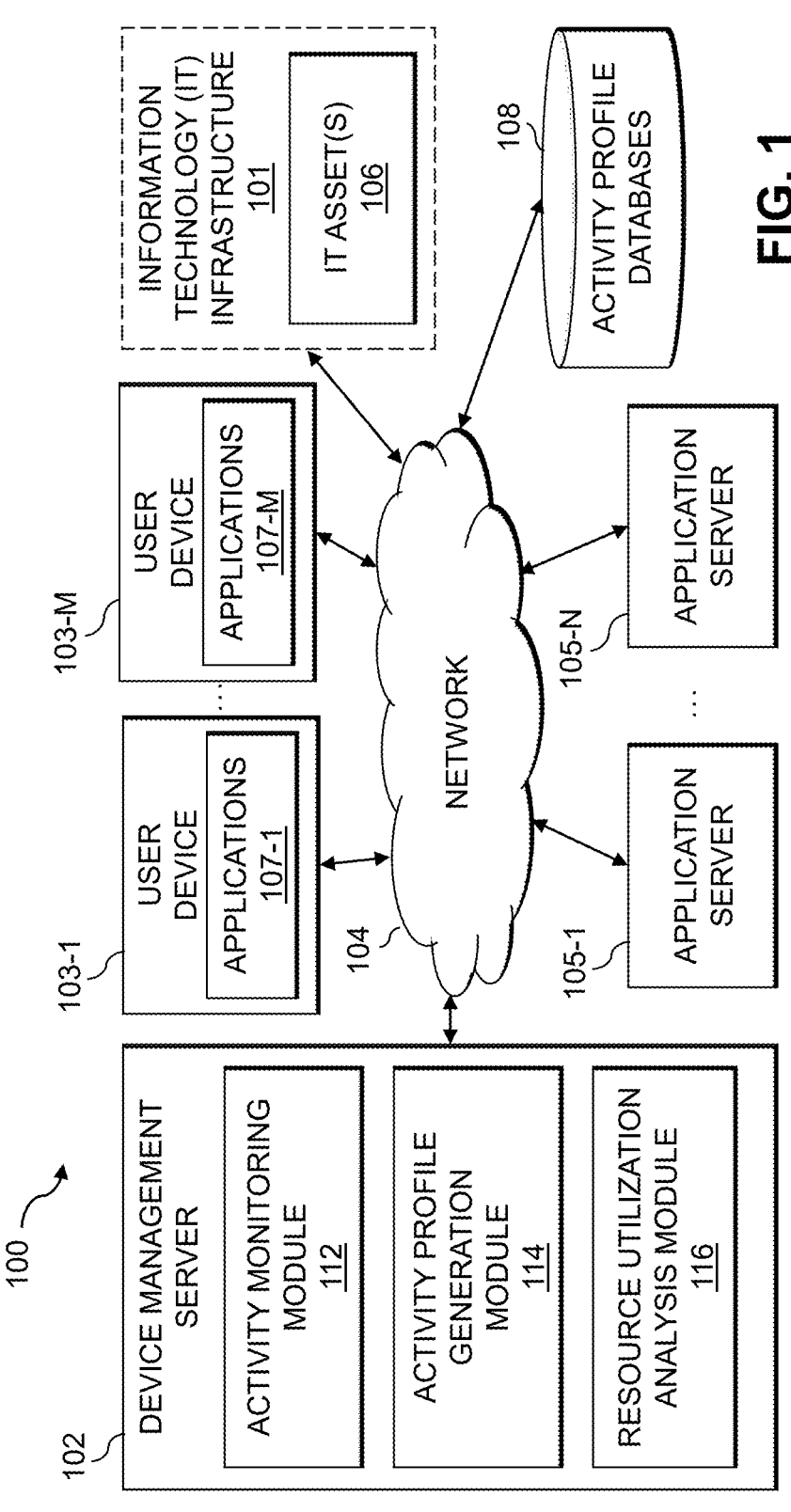
FIG. 1 illustrates an information processing system configured for generation of activity profiles limiting utilization of information technology assets in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for generation of activity profiles limiting utilization of IT assets.

Identity governance comprises a set of security policies and guidelines that allow an organization to manage user identities and access across the organization. In this manner, the organization can oversee and regulate the utilization of computing resources and other resources by entities, such as users and applications. The resources (e.g., hardware and software resources) associated with a large organization, for example, are typically quite diverse and require administrators to employ multiple tools in order to establish and implement access restrictions for the various types of resources.

In one or more embodiments, the disclosed activity profile generation techniques monitor typical behavior of users and/or applications to automatically generate activity profiles that impose one or more limits on the utilization of, for example, hardware and/or software resources. The disclosed activity profile generation techniques may collect information by monitoring (e.g., using one or more monitoring agents) a utilization of applications and other resources by the monitored users, and a utilization of an IT infrastructure by applications employed by the monitored users. The collected information may be used to establish one or more requester activity profiles and/or one or more application activity profiles that define limits on a utilization of an IT infrastructure. For example, the monitoring may identify resources typically accessed by monitored users and/or applications, such as file directories and websites, as well as quantifying typical utilization amounts when accessing such resources, such as typical network bandwidth and/or number of active browsers.

In some embodiments, the users monitored to generate the requester activity profiles may be selected based on a similar user role, a similar user persona and/or a similar user type. The requester activity profiles may specify one or more limitations on a utilization of one or more devices or other resources by the respective requester. The application activity profiles may specify one or more limitations on a utilization of one or more devices or other resources by the respective application that provides (e.g., hosts), at least in part, the respective application. The users monitored to generate the application activity profiles may use one or more applications for a designated period of time.

The generated activity profiles, in some embodiments, limit a utilization of IT assets and/or other resources and may include restrictions generated by observing typical activity of monitored users and applications. The typical activity may be statistically analyzed to identify, for example, typical uses of applications and typical amounts of resources consumed in the use of such applications. The limitations embodied in the generated activity profiles may comprise, for example, limitations related to the utilization of one or more IT assets or other resources of an IT infrastructure, such as a limit on a use of hardware resources of the IT infrastructure; a limit on a use of software resources of the IT infrastructure; a limit on a use of applications hosted by the IT assets; a limit on a use of data hosted by the IT assets; a limit on a distribution (e.g., sharing) of data hosted by (and/or generated by) the IT assets; a quantity of computing resources of the IT assets that may be utilized; a quantity of network resources of the IT assets that may be utilized; and/or a quantity of storage resources of the IT assets that may be utilized. The limitations specified by the generated activity profiles may be used to define how applications behave and/or an extent to which a user and/or an application can consume hardware resources, software resources and/or other resources.

FIG. 1 shows a computer network (also referred to herein as an information processing system) 100 configured in accordance with an illustrative embodiment. The computer network 100 comprises a plurality of user devices 103-1 through 103-M, collectively referred to herein as user devices 103. The user devices 103 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is an IT infrastructure 101 comprising one or more IT assets 106, one or more device management servers 102, one or more application servers 105-1 through 105-N, collectively referred to herein as application servers 105, and one or more activity profile databases 108, discussed below.

The user devices 103 may comprise, for example, host devices and/or devices such as mobile telephones, laptop computers, tablet computers, desktop computers or other types of computing devices. Such devices are examples of what are more generally referred to herein as "processing devices" which may be protected using the disclosed device protection techniques. Some of these processing devices are also generally referred to herein as "computers." The user devices 103 may comprise a network client that includes networking capabilities such as ethernet, Wi-Fi, etc. When the user devices 103 are implemented as host devices, the host devices may illustratively comprise servers or other types of computers of an enterprise computer system, cloud-based computer system or other arrangement of multiple compute nodes associated with respective users.

For example, the user devices 103-1 through 103-M in some embodiments illustratively provide compute services such as execution of one or more applications 107-1 through

107-M (collectively referred to herein as applications 107) on behalf of each of one or more users associated with respective ones of the user devices 103. The one or more applications 107 may be hosted by the one or more application servers 105.

The user devices 103 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

It is to be appreciated that the term "user" in this context and elsewhere herein is intended to be broadly construed so as to encompass, for example, human, hardware, software or firmware entities (including services), as well as various combinations of such entities. Compute and/or storage services may be provided for users under a Platform-as-a-Service (PaaS) model, a Storage-as-a-Service (STaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The application servers 105 may comprise, for example, application servers and/or portions of one or more server systems. Such devices are examples of what are more generally referred to herein as "processing devices." Some of these processing devices are also generally referred to herein as "computers." The application servers 105 may be implemented using virtual and/or physical machines. The application servers 105 in some embodiments comprise respective servers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

The IT assets 106 may comprise physical and/or virtual computing resources in the IT infrastructure 101. Physical computing resources may include physical hardware such as servers, host devices, storage systems, networking equipment, Internet of Things (IoT) devices, and other types of processing and computing devices including desktops, laptops, tablets, smartphones, etc. Virtual computing resources may include virtual machines (VMs), containers, etc.

The IT assets 106 of the IT infrastructure 101 may host applications 107 that are utilized by respective ones of the user devices 103, such as in accordance with a client-server computer program architecture. In some embodiments, the applications 107 comprise web applications designed for delivery from assets in the IT infrastructure 101 to users (e.g., of user devices 103) over the network 104. Various other examples are possible, such as where one or more software applications are used internal to the IT infrastructure 101 and not exposed to the user devices 103. It should be appreciated that, in some embodiments, some of the IT assets 106 of the IT infrastructure 101 may themselves be viewed as applications or more generally as software or hardware.

The user devices 103 are configured to access or otherwise utilize the IT infrastructure 101. In some embodiments, the user devices 103 are assumed to be associated with users that execute one or more applications 107. In other embodiments, the user devices 103 are assumed to be associated with system administrators, IT managers or other authorized personnel responsible for managing the IT assets 106 of the IT infrastructure 101 (e.g., where such management includes configuring email accounts of one or more users). For example, a given one of the user devices 103 may be operated by a user to access a graphical user interface (GUI) provided by the device management server 102 to manage historical resource utilization data, for example. The device management server 102 may be provided as a cloud service that is accessible by the given user device 103 to allow the user thereof to process historical resource utilization data in accordance with the disclosed activity profile generation techniques.

In some embodiments, the IT assets 106 of the IT infrastructure 101 are owned or operated by the same enterprise that operates the device management server 102 (e.g., where an enterprise such as a business provides support for the assets it operates). In other embodiments, the IT assets 106 of the IT infrastructure 101 may be owned or operated by one or more enterprises different than the enterprise which operates the device management server 102 (e.g., a first enterprise provides support for assets that are owned by multiple different customers, business, etc.). Various other examples are possible.

An enterprise may subscribe to or otherwise utilize the device management server 102 to automatically implement the disclosed activity profile generation techniques. As used herein, the term "enterprise system" is intended to be construed broadly to encompass any group of systems or other computing devices. For example, the IT assets 106 of the IT infrastructure 101 may provide a portion of one or more enterprise systems. A given enterprise system may also or alternatively include one or more of the user devices 103. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

As shown in FIG. 1, an exemplary device management server 102 may comprise an activity monitoring module 112, an activity profile generation module 114, and a resource utilization analysis module 116. In some embodiments, the activity monitoring module 112 collects information by monitoring (e.g., using one or more monitoring agents on user devices 103 and other IT assets 106) a utilization of applications and other resources by designated users, and a utilization of the IT infrastructure 101 by applications employed by the monitored users. The collected information may be employed by the disclosed activity profile generation techniques to establish one or more requester activity profiles and/or one or more application activity profiles that specify limits on a utilization of the IT infrastructure 101. For example, a given application may be monitored by different types of users, to ascertain how the given application typically acts on the devices of such monitored users when performing their duties (e.g., whether the given application interacts with other applications, requires certain resources (e.g., compute, memory, network and/or storage resources) or accesses the Internet or other networks during the monitoring period).

The activity profile generation module 114 may process the information collected by the activity monitoring module 112 to generate one or more activity profiles specifying one or more restrictions based on the monitored typical behavior of the users and/or applications. For example, monitored typical behavior of the users and/or applications may be permitted in the generated activity profiles and atypical behavior of the users and/or applications may be restricted in the generated activity profiles.

The resource utilization analysis module 116 may receive one or more requests to utilize one or more resources (e.g., from users and/or applications) and determine a resource utilization limitation decision based on one or more applicable requester activity profiles and/or application activity profiles, as discussed further below in conjunction with FIG. 2.

It is to be appreciated that this particular arrangement of modules 112, 114, 116 illustrated in the device management server 102 of the FIG. 1 embodiment is presented by way of example only, and alternative arrangements can be used in other embodiments. For example, the functionality associated with modules 112, 114, 116 in other embodiments can be combined into a single element, or separated across a larger number of elements. As another example, multiple distinct processors can be used to implement different ones of modules 112, 114, 116, or portions thereof.

At least portions of modules 112, 114, 116 may be implemented at least in part in the form of software that is stored in memory and executed by a processor. An exemplary process utilizing modules 112, 114, 116 of the device management server 102 in computer network 100 will be described in more detail with reference to FIGS. 3 through 5, for example.

Other device management servers 102 (not shown in FIG. 1) are assumed to be configured in a manner similar to that shown for device management server 102 in the figure.

The device management server 102 may be implemented, for example, on the cloud, such as a private cloud, or on the premises of an enterprise or another entity. In some embodiments, the device management server 102, or portions thereof, may be implemented as part of a host device. The device management server 102 may implement server-side functionality associated with the disclosed activity profile generation techniques, such as, for example, (i) monitoring a utilization of applications and other resources by designated users, and a utilization of the IT infrastructure 101 by applications employed by the monitored users, (ii) processing the monitored information to generate one or more activity profiles specifying one or more restrictions based on the monitored typical behavior of the users and/or applications, and/or (iii) evaluating one or more requests to utilize one or more resources to determine a resource utilization limitation decision based on one or more requester activity profiles and/or application activity profiles.

Additionally, the device management server 102 can have an associated activity profile database 108 configured to store, for example, a set of activity profiles (e.g., generated using the disclosed activity profile generation techniques) and/or resource utilization data, which is used by one or more of the device management servers 102 to generate such activity profiles, as discussed further below. The activity profile database 108 may be maintained and accessed by, for example, one or more of the device management servers 102.

The activity profile database 108 in the present embodiment is implemented using one or more storage systems associated with the device management server 102. Such storage systems can comprise any of a variety of different types of storage such as, network-attached storage (NAS), storage area networks (SANs), direct-attached storage (DAS) and distributed DAS, as well as combinations of these and other storage types, including software-defined storage.

One or more of the device management servers 102, user devices 103, application servers 105 and/or the IT assets 106 of the IT infrastructure 101 may be implemented on a common processing platform, or on separate processing platforms. The one or more device management servers 102 and user devices 103, for example, may be configured to interact over the network 104 in at least some embodiments.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 103 and the storage system to reside in different data centers. Numerous other distributed implementations of the host devices and the storage system are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with one or more device of the device management servers 102, user devices 103, application servers 105 and/or the IT assets 106 of the IT infrastructure 101 can be one or more input-output devices (not shown), which illustratively comprise keyboards, displays or other types of input-output devices in any combination. Such input-output devices can be used, for example, to support one or more user interfaces to the device management server 102, as well as to support communication between the device management server 102 and other related systems and devices not explicitly shown.

The device management servers 102, user devices 103, application servers 105 and/or the IT assets 106 of the IT infrastructure 101 in the FIG. 1 embodiment are assumed to be implemented using at least one processing device. Each such processing device generally comprises at least one processor and an associated memory and implements one or more functional modules for controlling certain features of the respective device.

More particularly, the device management servers 102, user devices 103, application servers 105 and/or the IT assets 106 of the IT infrastructure 101 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the device management servers 102, user devices 103, application servers 105 and/or the IT assets 106 of the IT infrastructure 101 to communicate in some embodiments over the network 104 with each other (as well as one or more other networked devices), and illustratively comprises one or more conventional transceivers.

It is to be understood that the particular set of elements shown in FIG. 1 for generation of activity profiles limiting utilization of the IT assets 106 is presented by way of illustrative example only, and in other embodiments additional or alternative elements may be used. Thus, another embodiment includes additional or alternative systems, devices and other network entities, as well as different arrangements of modules and other components.

Figure 2:
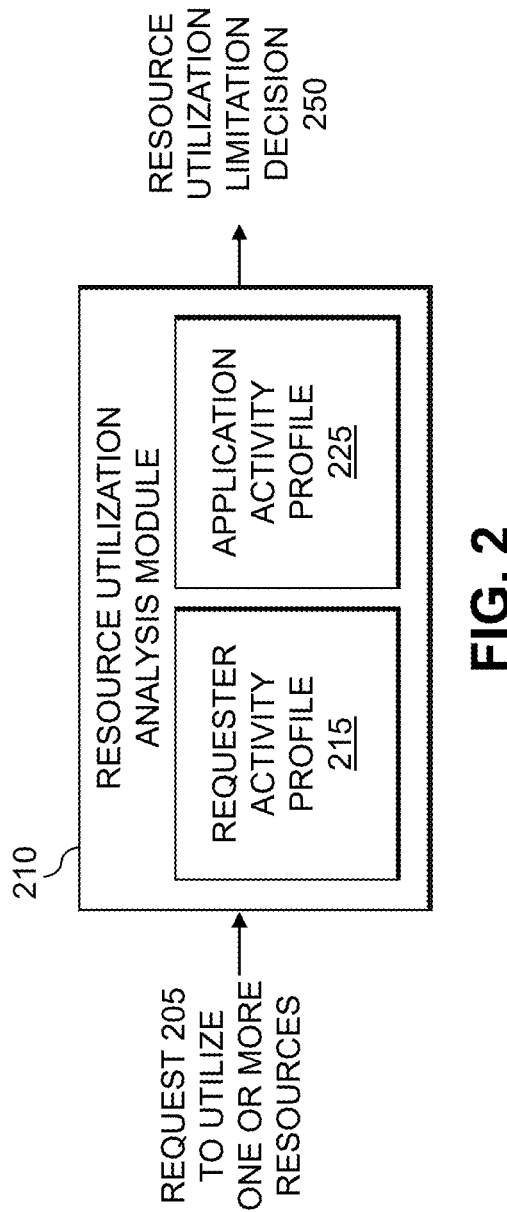
FIG. 2 illustrates the resource utilization analysis module of FIG. 1 in further detail in accordance with an illustrative embodiment.

FIG. 2 illustrates a resource utilization analysis module 210 in accordance with an illustrative embodiment. As noted above, the resource utilization analysis module 210 may receive one or more requests 205 to utilize one or more resources (e.g., from users and/or applications) and determine a resource utilization limitation decision 250 based on one or more applicable requester activity profiles 215 and/or application activity profiles 225.

In some embodiments, an identity of a requester associated with a given request 205 may be used to identify a requester activity profile 215 from, for example, the activity profile databases 108. The requester may be classified using one or more of a user role, a user persona and/or a user type of the requester. For example, the user role of the requester may be based on a title, position and/or job description of the requester of the requester, a type of activity commonly performed by the requester and/or another type of characteristic which may be ascribed to the requester. A given requester may be assigned (e.g., in advance) to a particular user role, particular user persona and/or particular user type.

In some embodiments, an identity of an application associated with a given request 205 may be used to identify an application activity profile 225 from, for example, the activity profile databases 108. The application may have an associated application type, for example, that is used to identify a corresponding application activity profile 225.

The requester activity profile 215 and/or the application activity profile 225 associated with a given request may be used by the resource utilization analysis module 210 to determine a resource utilization limitation decision 250 that limits the use of one or more resources of the IT infrastructure 101, for example, as discussed in U.S. patent application Ser. No. 18/488,537, filed Oct. 17, 2023, entitled "Enforcing Limits on Use of Endpoint Devices," incorporated by reference herein in its entirety.

FIG. 3 is a process diagram illustrating an application activity profile generation process 300 in accordance with an illustrative embodiment. The application activity profile generation process 300 provides an automated method to generate an application activity profile by studying normal or typical behavior of an entity, such as a user or an application. In the example of FIG. 3, the application activity profile generation process 300 monitors a controlled group of users (e.g., from a general population) in step 1 that uses a given application. The controlled group of users is directed in step 2 to use the given application for a designated period of time. A behavior of the given application is monitored in step 3 for the designated period of time to obtain logged data, and the logged data is processed in step 4 based on a data type of the logged data to generate an application activity profile using a designated level of restrictiveness. The designated level of restrictiveness may be selected (e.g., by a user) from a range of restriction levels for at least some of the IT assets (specified, for example, using a slider presented within a user interface), where a more restrictive designation authorizes a smaller population of the plurality of users relative to a less restrictive designation.

FIG. 4 is a process diagram illustrating a requester activity profile generation process 400 in accordance with an illustrative embodiment. The requester activity profile generation process 400 provides an automated method to generate an application activity profile by studying normal or typical behavior of a specific population (e.g., having a similar user role, a similar user persona and/or a similar user type). In the example of FIG. 4, a controlled group of users is identified in step 1 that share the same role, persona and/or other user type. The controlled group is directed in step 2 to perform regular activities for a designated period of time. A behavior of the controlled group is monitored in step 3 for the designated period of time to obtain logged data, and the logged data is processed in step 4 based on a data type of the logged data to generate a role-based requester activity profile using a designated level of restrictiveness. As noted above, the designated level of restrictiveness may be selected (e.g., by a user) from a range of restriction levels for at least some of the IT assets (specified, for example, using a slider presented within a user interface), where a more restrictive designation authorizes a smaller population of the plurality of users relative to a less restrictive designation.

Figure 5:
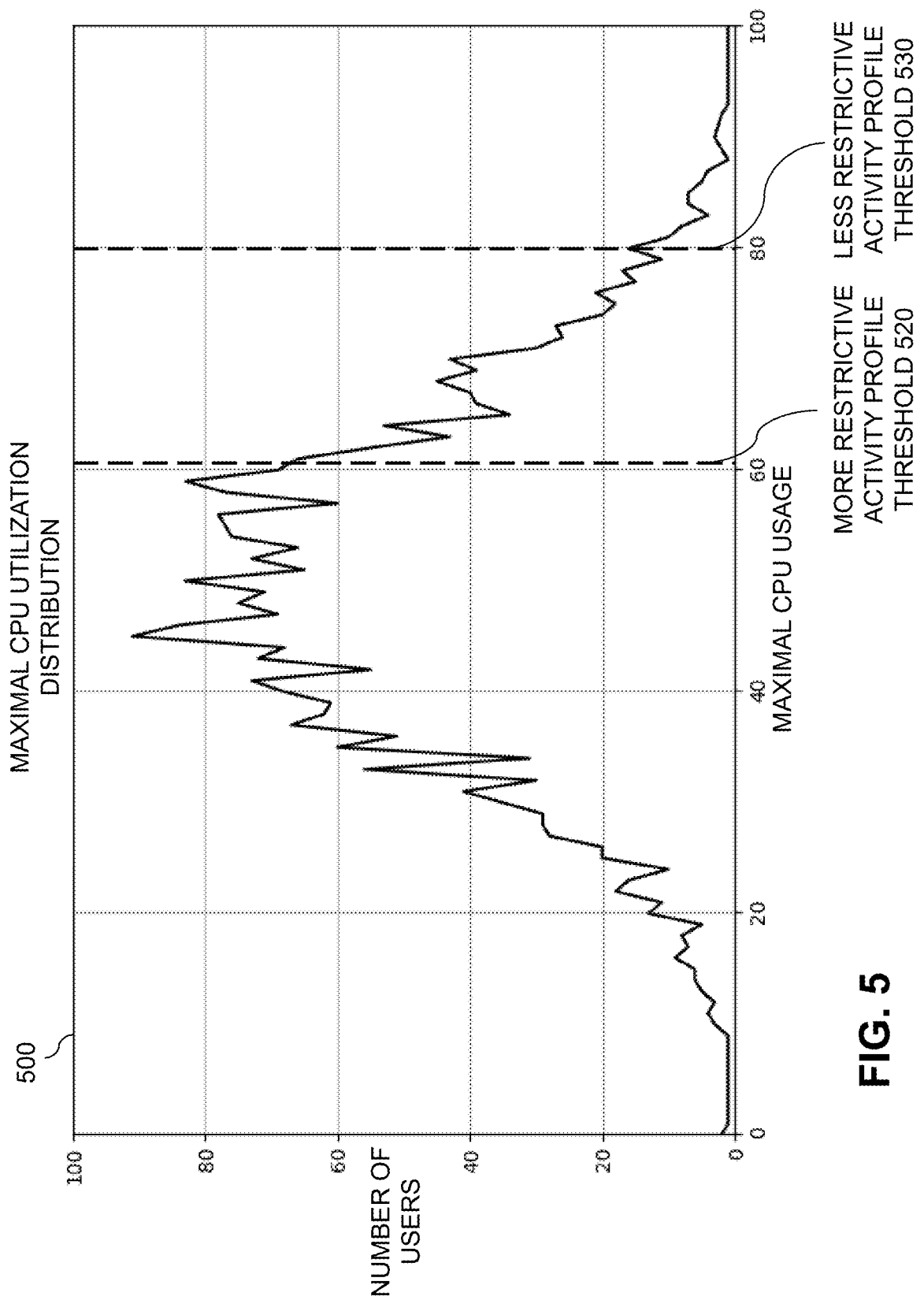
FIG. 5 illustrates a number of activity profile thresholds relative to a maximal central processing unit (CPU) utilization distribution in accordance with an illustrative embodiment.

FIG. 5 illustrates a number of activity profile thresholds relative to a maximal CPU utilization distribution in accordance with an illustrative embodiment. As discussed further below in conjunction with FIGS. 6 through 8, the logged data obtained by the monitoring of FIGS. 3 and 4, for example, may be processed in various ways according to a data type of the logged data. The logged data processing phase may comprise determining a desired restriction level (e.g., for a given organization or a subset of the given organization), using the desired restriction level to determine one or more activity profile thresholds, and filtering and processing the logged data to create one or more activity profiles.

In some embodiments, the desired level of restrictiveness (e.g., in a range between 0 and 100) may be designated by an appropriate user (e.g., an IT administrator) using, for example, a slider bar, a text entry dialog box or another user interface element presented in a user interface that allows the user to specify the desired level of restrictiveness. In some embodiments, a more restrictive activity profile is limited to the typical or average behavior observed in the controlled group of monitored users. A less restrictive activity profile may also allow or authorize outlier behavior that is a typical or below average behavior observed in the controlled group of monitored users.

In the example of FIG. 5, illustrating a maximal CPU utilization distribution 500 for different numbers of users, a more restrictive activity profile threshold 520 and a less restrictive activity profile threshold 530 are shown. It is noted that in the bell-shaped curve of FIG. 5, users at either edge of the bell-shaped curve are not common or typical users. The more restrictive activity profile threshold 520 would allow the corresponding application to use 60% of the CPU resources (e.g., associated with 81.3% of the controlled population for the corresponding application that had a maximal CPU usage of 60% or less). The less restrictive activity profile threshold 530 would allow the corresponding application to use 80% of the CPU resources (e.g., associated with 98.2% of the controlled population for the corresponding application that had a maximal CPU usage of 80% or less). The use of the activity profile thresholds 520, 530 of FIG. 5 is discussed further below in conjunction with FIGS. 6 through 8.

Figure 6:
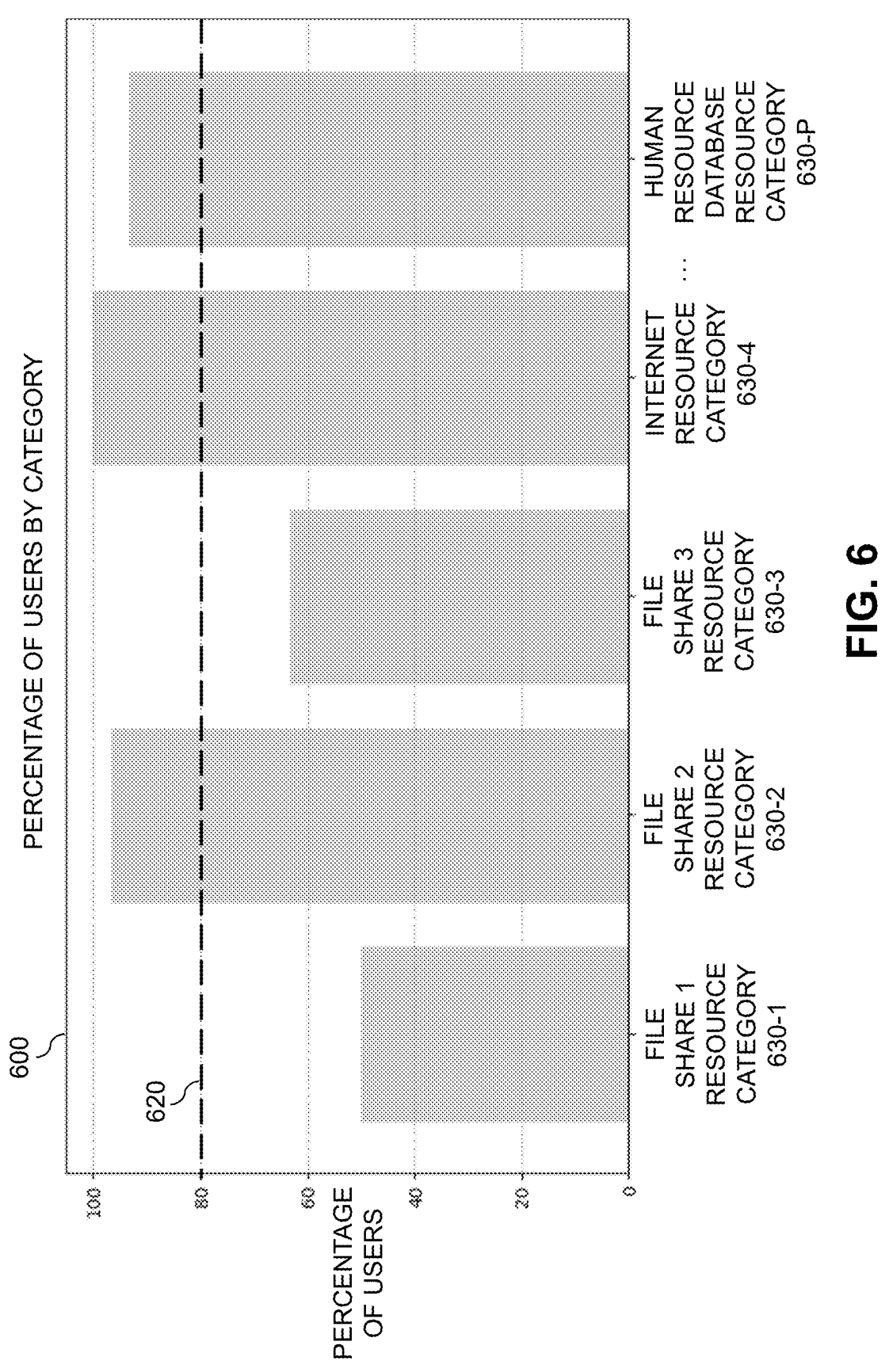
FIG. 6 illustrates an application of a designated activity profile threshold to a percentage of users for a number of exemplary resource categories related to a utilization of one or more IT assets in accordance with an illustrative embodiment.

FIG. 6 illustrates an application of a designated activity profile threshold 620 to a percentage of users for a number of exemplary resource categories 630-1 through 630-P, collectively referred to herein as resource categories 630, related to a utilization of one or more IT assets in accordance with an illustrative embodiment. In the example of FIG. 6, a bar graph 600 illustrates a percentage of users (along the y-axis) that utilize (e.g., access) each of the resource categories 630-1 through 630-P, such as a file share 1 resource category 630-1, a file share 2 resource category 630-2, a file share 3 resource category 630-3, an Internet resource category 630-4 and a human resource database resource category 630-P.

The designated activity profile threshold 620 is applied to the bar graph 600 to identify those resource categories 630 that satisfy the designated activity profile threshold 620 (e.g., those resource categories 630 having a percentage of users above the designated activity profile threshold 620 will be authorized in the generated activity profile). For example, setting a designated activity profile threshold 620 of 80/100, as shown in the example of FIG. 6, indicates that any resource category 630 with a value of 80% (or more) of the controlled user population will be authorized. The designated activity profile threshold 620 may be determined, for example, by a user manipulating a slider bar, a text entry dialog box or another user interface element to set the desired value, as discussed above in conjunction with FIG. 5.

The exemplary bar graph 600 of FIG. 6 is an example of nominal data that groups the variables into resource categories 630 (e.g., the number of users that used a specific hardware component or accessed a specific file share, etc.). As shown in FIG. 6, the resource categories 630 are related to the utilization of one or more of the IT assets (e.g., accessing files shares stored by such IT assets) and an access of the resource categories 630 that satisfy (e.g., is greater than or equal to) the designated activity profile threshold 620 is authorized in the generated activity profile.

In the example of FIG. 6, the following resource categories would be authorized for users of the corresponding application: the file share 2 resource category 630-2 (having a percentage of users of 96%); the Internet resource category 630-4 (having a percentage of users of 100%); and the human resource database resource category 630-P (having a percentage of users of 93%).

Figure 7:
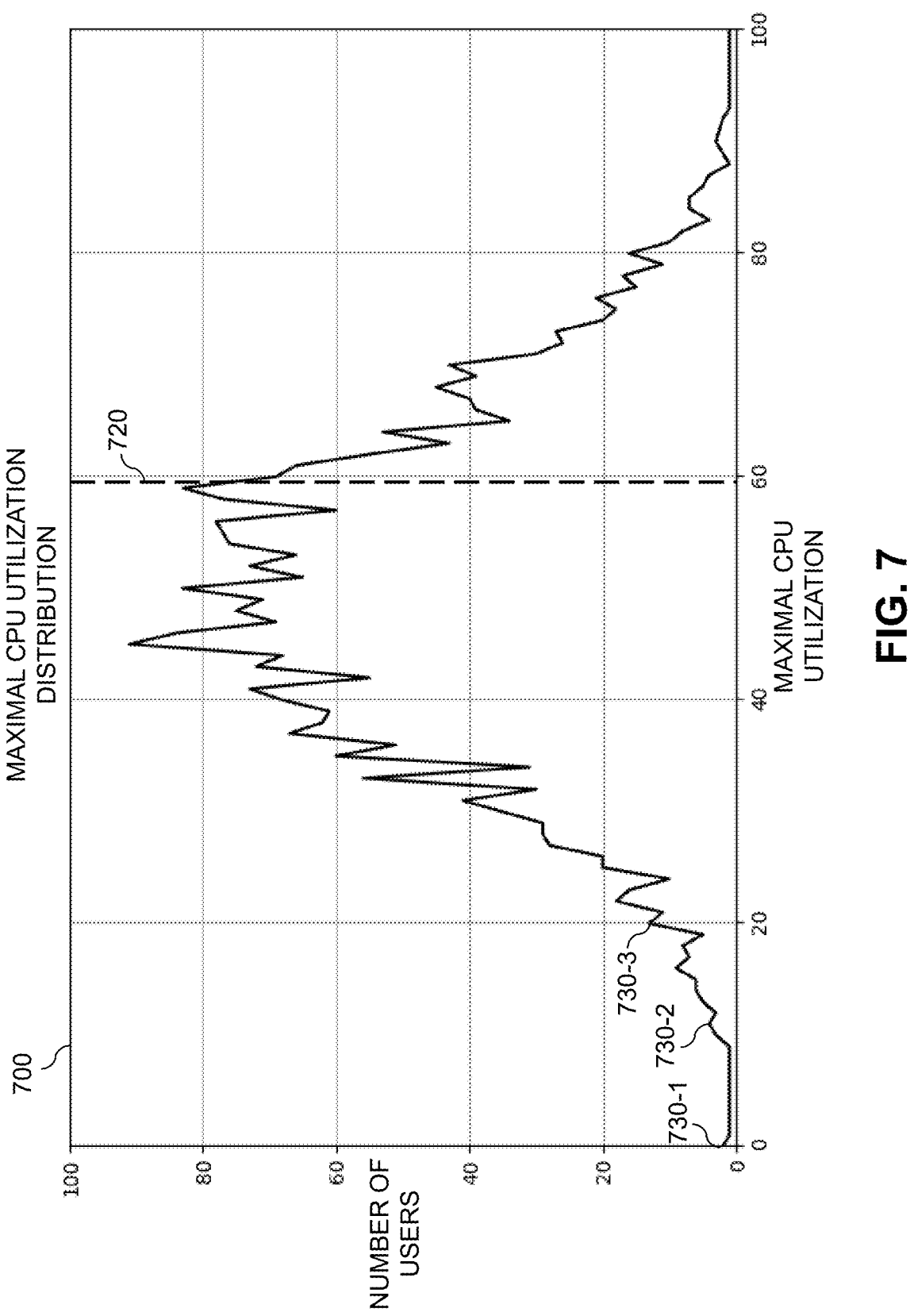
FIG. 7 illustrates an application of a designated activity profile threshold to a maximal CPU utilization distribution in accordance with an illustrative embodiment.

FIG. 7 illustrates an application of a designated activity profile threshold 720 to a maximal CPU utilization distribution 700 in accordance with an illustrative embodiment. In the example of FIG. 7, the maximal CPU utilization distribution 700 illustrates a number of users (along the y-axis) that utilize various amounts of maximal CPU utilization (along the x-axis). It is noted that in the bell-shaped curve of FIG. 7, users at either edge of the bell-shaped curve are not common or typical users. For example, at a point 730-1, two users essentially had no CPU utilization (e.g., a maximal CPU utilization of 0%); at a point 730-2, six users had a light CPU utilization (e.g., a maximal CPU utilization of 10%), which does not include the users described in point 730-1; and at a point 730-3, 12 users had a light CPU usage (e.g., a maximal CPU utilization of 20%), which again does not include the users described in points 730-1 or 730-2.

The exemplary maximal CPU utilization distribution 700 of FIG. 7 is an example of ordinal data that follows a natural order. The designated activity profile threshold 720 indicates a limitation of a utilization of the CPU resource associated with one or more IT assets in the generated activity profile. For example, setting a designated activity profile threshold 720 of 80/100, as shown in FIG. 7, means that the authorized value would be based on the maximal CPU utilization values that were used by 80% of the monitored population (or more). The designated activity profile threshold 720 may be determined, for example, by a user manipulating a slider bar, a text entry dialog box or another user interface element to set the desired value, as discussed above in conjunction with FIG. 5. In the example of FIG. 7, the maximal CPU utilization will be restricted to a 59% maximal CPU utilization (associated with 80% or more of the population).

Figure 8:
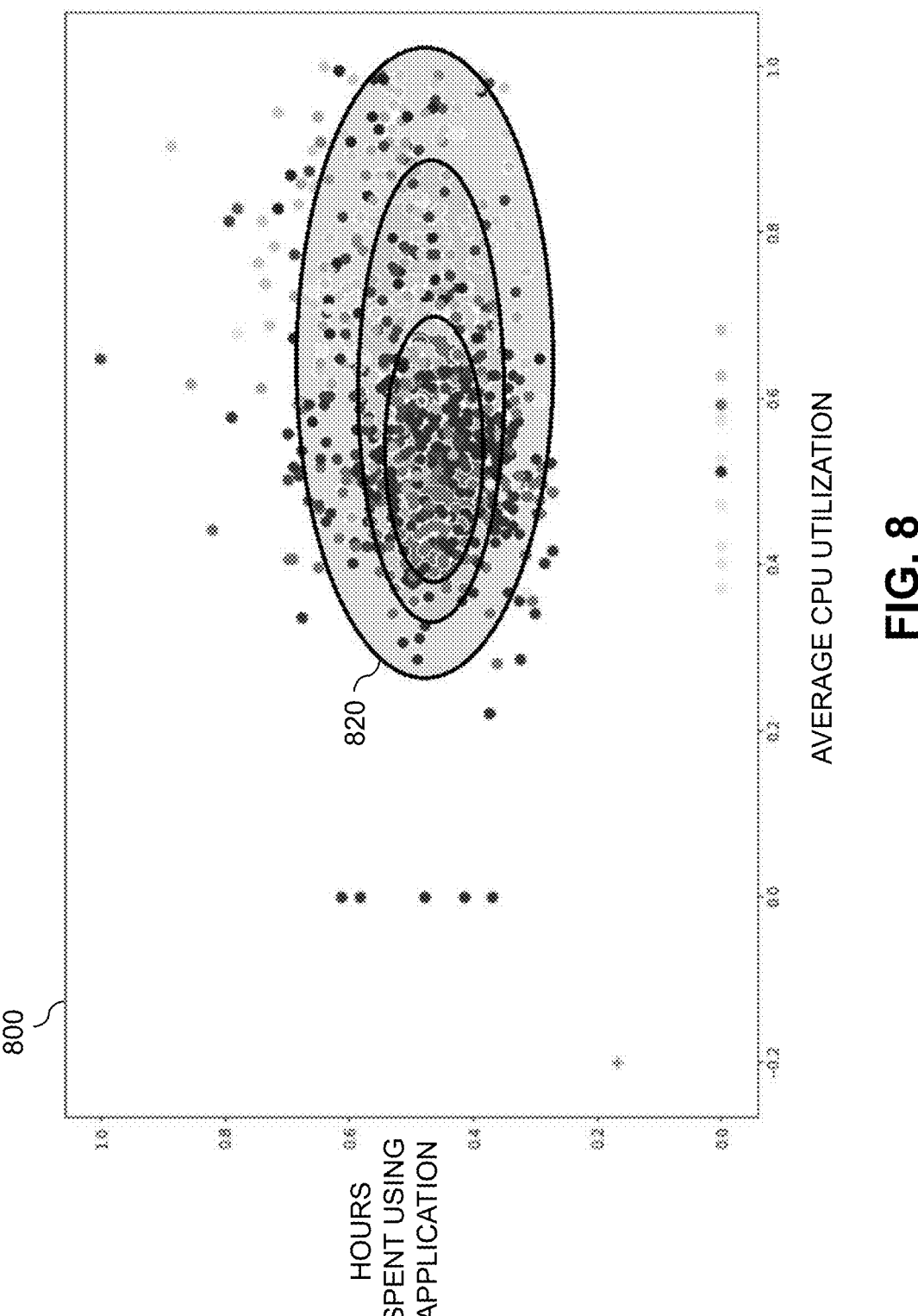
FIG. 8 illustrates an application of a designated activity profile threshold to one or more clusters related to first and second variables associated with one or more IT assets in accordance with an illustrative embodiment.

FIG. 8 illustrates an application of a designated activity profile threshold 820 to one or more clusters related to first and second variables associated with one or more IT assets in accordance with an illustrative embodiment. In the example of FIG. 8, the first and second variables comprise a number of hours spent using an application (along the y-axis) and an average CPU utilization (along the x-axis). Generally, typical behavior related to various resources tends to be clustered, with some outlier values. The users in the same cluster tend to exhibit similar behavior with respect to one or more resources.

The exemplary data distribution 800 of FIG. 8 is an example of a complex distribution data type. The designated activity profile threshold 820 indicates a cell threshold density associated with authorized behavior in the generated activity profile. For example, setting a higher designated activity profile threshold means that the cluster analysis will be based on a higher cell threshold density (e.g., associated with rings towards the center of a given cluster) and setting a lower designated activity profile threshold 820, as shown in the example of FIG. 8, means that the cluster analysis will be based on a lower cell threshold density (e.g., associated with rings towards the perimeter of a given cluster). The designated activity profile threshold 820 may be determined, for example, by a user manipulating a slider bar, a text entry dialog box or another user interface element to set the desired value, as discussed above in conjunction with FIG. 5.

In the example of FIG. 8, if a higher designated activity profile threshold is selected, for example, associated with the center ring of the given cluster of FIG. 8, a person using the given application in a range between approximately 0.4 and 0.55 hours would be permitted an average CPU utilization in a range between approximately 40% and 70%. Likewise, if a lower designated activity profile threshold is selected, for example, associated with the outer ring of the given cluster of FIG. 8, a person using the given application in a range between approximately 0.33 and 0.68 hours would be permitted an average CPU utilization in a range between approximately 30% and 100%.

FIG. 9 is a flow chart illustrating an exemplary implementation of a process 900 for generation of activity profiles limiting utilization of IT assets in accordance with an illustrative embodiment. In the example of FIG. 9, the process 900 monitors, in step 902, a plurality of users interacting with a plurality of IT assets of an IT infrastructure to obtain logged data. In step 904, at least one threshold is determined based at least in part on a designated restriction level for at least some of the IT assets.

The logged data is processed in step 906 based at least in part on a data type (e.g., a nominal data type, an ordinal data type and/or a complex distribution data type) of the logged data to automatically generate at least one activity profile characterizing one or more limitations related to a utilization of one or more of the IT assets, wherein the one or more limitations are determined by applying the at least one threshold to a representation (e.g., numerical, graphical and/or visual representations) of the logged data. At least one automated action is initiated in step 908 using the at least one activity profile, wherein the at least one automated action comprises automatically controlling access to at least one of the IT assets based at least in part on the at least one activity profile.

In some embodiments, the at least one activity profile may comprise at least one requester activity profile and the plurality of monitored users may be selected based at least in part on one or more of a user role, a user persona and a user type. The at least one activity profile may also, or alternatively, comprise at least one application activity profile and the plurality of monitored users may use one or more applications for the designated period of time.

In one or more embodiments (e.g., when the data type of the logged data comprises a nominal data type), the logged data may comprise a plurality of resource categories related to the utilization of one or more of the IT assets and wherein an access of one or more of the resource categories that satisfy the at least one threshold are authorized in the at least one activity profile. The logged data may comprise a distribution related to a utilization of at least one resource associated with one or more of the IT assets (e.g., when the data type of the logged data comprises an ordinal data type) and the at least one threshold may indicate a limitation of a utilization of one or more of the at least one resource associated with the one or more IT assets in the at least one activity profile. The logged data may comprise one or more clusters related to first and second variables associated with one or more of the IT assets (e.g., when the data type of the logged data comprises a complex distribution data type) and the at least one threshold may indicate a cell threshold density associated with authorized behavior in the at least one activity profile.

In at least one embodiment, the one or more limitations related to the utilization of the one or more IT assets may comprise a limit on a use of one or more hardware resources of the IT infrastructure; a limit on a use of one or more software resources of the IT infrastructure; a limit on a use of one or more applications hosted by the one or more IT assets; a limit on a use of at least portions of data hosted by the one or more IT assets; a limit on a distribution of data hosted by the one or more IT assets; a quantity of computing resources of the one or more IT assets that are utilized; a quantity of network resources of the one or more IT assets that are utilized; and/or a quantity of storage resources of the one or more IT assets that are utilized.

In an embodiment, the at least one automated action may comprise generating one or more notifications related to the at least one activity profile; generating one or more signals related to the at least one activity profile (e.g., signals providing the at least one activity profile to an access control system that evaluates a given request to utilize one or more of the IT assets); and/or controlling a performance of at least one action in one or more of the IT assets using the at least one activity profile (e.g., performing an access control function evaluates whether a given request to utilize one or more of the IT assets is authorized, using the at least one activity profile). The designated restriction level may be selected from a range of restriction levels for at least some of the IT assets (specified, for example, using a slider presented within a user interface), where a more restrictive designation authorizes a smaller population of users relative to a less restrictive designation.

The particular processing operations and other network functionality described in conjunction with FIGS. 3, 4 and 9, for example, are presented by way of illustrative example only, and should not be construed as limiting the scope of the disclosure in any way. Alternative embodiments can use other types of processing operations for generation of activity profiles limiting utilization of IT assets. For example, the ordering of the process steps may be varied in other embodiments, or certain steps may be performed concurrently with one another rather than serially. In one aspect, the process can skip one or more of the steps. In other aspects, one or more of the steps are performed simultaneously. In some aspects, additional steps can be performed.

Among other benefits, the disclosed techniques for generation of activity profiles limiting utilization of IT assets can be employed, for example, to consolidate different types of expected behaviors of users and/or applications in a single activity profile. In addition, the disclosed activity profile generation techniques may be employed to generate activity profiles for different entity types, such as users, application and files. The ability to selectively control values for designated activity profile thresholds (for example, by manipulating a slider bar) allows a user to control a level of restrictiveness and thereby selectively allow (or deny) expected and unexpected behavior of different entities based on real-life utilization.

One or more embodiments of the disclosure provide improved methods, apparatus and computer program products for generation of activity profiles limiting utilization of IT assets. The foregoing applications and associated embodiments should be considered as illustrative only, and numerous other embodiments can be configured using the techniques disclosed herein, in a wide variety of different applications.

It should also be understood that the disclosed activity profile generation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for generation of activity profiles limiting utilization of IT assets may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based activity profile generation engine, or portions thereof, are illustratively implemented for use by tenants of such a multi-tenant environment.

Cloud infrastructure as disclosed herein can include cloud-based systems. Virtual machines provided in such systems can be used to implement at least portions of a cloud-based activity profile generation platform in illustrative embodiments. The cloud-based systems can include object stores.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. These platforms may also be used to implement at least portions of other information processing systems in other embodiments.

Figure 10:
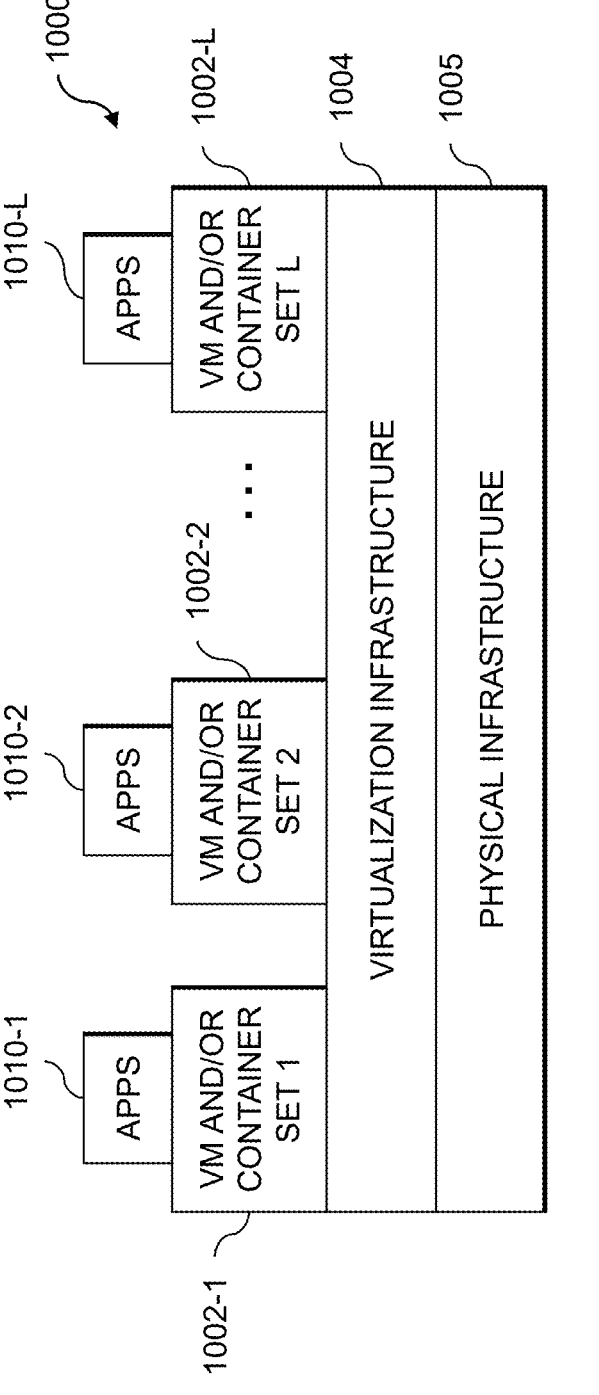
FIG. 10 illustrates an exemplary processing platform that may be used to implement at least a portion of one or more embodiments of the disclosure comprising a cloud infrastructure.

FIG. 10 shows an example processing platform comprising cloud infrastructure 1000. The cloud infrastructure 1000 comprises a combination of physical and virtual processing resources that may be utilized to implement at least a portion of the information processing system 100. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. Such implementations can provide activity profile generation functionality of the type described above for one or more processes running on a given one of the VMs. For example, each of the VMs can implement activity profile generation control logic and associated logged resource utilization data processing functionality for one or more processes running on that particular VM.

An example of a hypervisor platform that may be used to implement a hypervisor within the virtualization infrastructure 1004 is the VMware® vSphere® which may have an associated virtual infrastructure management system such as the VMware® vCenter™. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system. Such implementations can provide activity profile generation functionality of the type described above for one or more processes running on different ones of the containers. For example, a container host device supporting multiple containers of one or more container sets can implement one or more instances of activity profile generation control logic and associated logged resource utilization data processing functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises at least a portion of the given system and includes a plurality of processing devices, denoted 1102-1, 1102-2, 1102-3, . . . 1102-K, which communicate with one another over a network 1104. The network 1104 may comprise any type of network, such as a WAN, a LAN, a satellite network, a telephone or cable network, a cellular network, a wireless network such as WiFi or WiMAX, or various portions or combinations of these and other types of networks.

The processing device 1102-1 in the processing platform 1100 comprises a processor 1110 coupled to a memory 1112. The processor 1110 may comprise a microprocessor, a microcontroller, an ASIC, an FPGA or other type of processing circuitry, as well as portions or combinations of such circuitry elements, and the memory 1112, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and the given system may include additional or alternative processing platforms, as well as numerous distinct processing platforms in any combination, with each such platform comprising one or more computers, storage devices or other processing devices.

Figure 11:
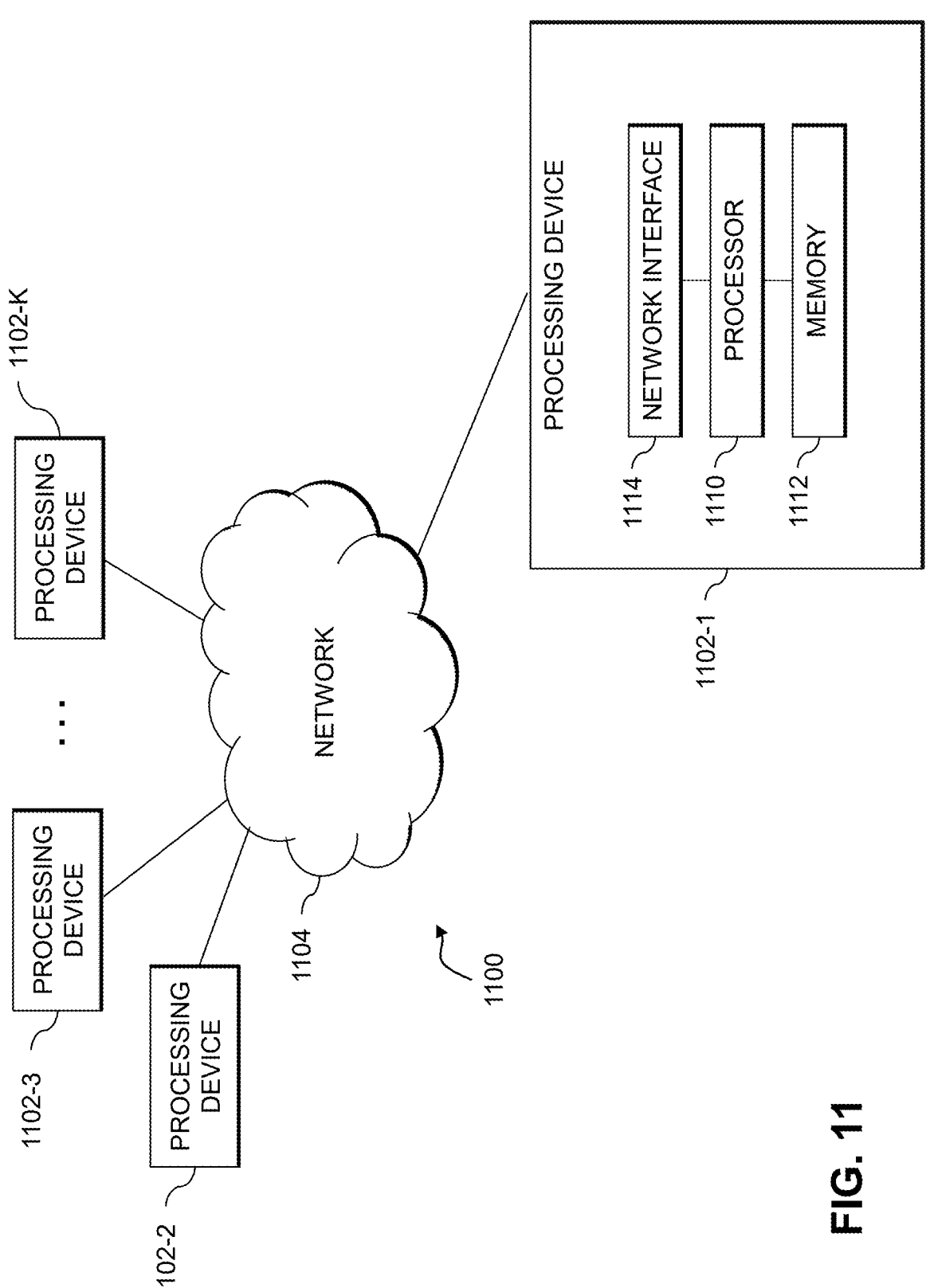
FIG. 11 illustrates another exemplary processing platform that may be used to implement at least a portion of one or more embodiments of the disclosure.

Multiple elements of an information processing system may be collectively implemented on a common processing platform of the type shown in FIG. 10 or 11, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

monitoring a plurality of users interacting with a plurality of information technology (IT) assets of an IT infrastructure to obtain logged data;

determining at least one threshold based at least in part on a designated restriction level for at least some of the plurality of IT assets, wherein a more restrictive designated restriction level authorizes one or more of (i) a smaller population of the plurality of users, (ii) a smaller population of a plurality of resource categories associated with one or more of the plurality of IT assets, (iii) a smaller resource utilization limit of one or more resources associated with one or more of the plurality of IT assets and (iv) a smaller average utilization range of one or more resources associated with one or more of the plurality of IT assets, relative to a less restrictive designated restriction level;

processing the logged data based at least in part on a data type of the logged data to automatically generate at least one activity profile characterizing one or more limitations related to a utilization of one or more of the plurality of IT assets, wherein the one or more limitations are determined by applying the at least one threshold to at least one representation of the logged data; and initiating at least one automated action using the at least one activity profile, wherein the at least one automated action comprises automatically controlling access to at least one of the plurality of IT assets based at least in part on the at least one activity profile;

wherein the method is performed by at least one processing device comprising a processor coupled to a memory.

2. The method of claim 1, wherein the at least one activity profile comprises at least one requester activity profile and wherein the plurality of monitored users is selected based at least in part on one or more of a user role, a user persona and a user type.

3. The method of claim 1, wherein the at least one activity profile comprises at least one application activity profile and wherein the plurality of monitored users use one or more applications for a designated period of time.

4. The method of claim 1, wherein the logged data comprises the plurality of resource categories related to the utilization of one or more of the plurality of IT assets and wherein an access of one or more of the plurality of resource categories that satisfy the at least one threshold is authorized in the at least one activity profile.

5. The method of claim 1, wherein the logged data comprises a distribution related to a utilization of at least one resource associated with one or more of the plurality of IT assets and wherein the at least one threshold indicates a limitation of a utilization of one or more of the at least one resource associated with the one or more of the plurality of IT assets in the at least one activity profile.

6. The method of claim 1, wherein the logged data comprises one or more clusters related to first and second variables associated with one or more of the plurality of IT assets and wherein the at least one threshold indicates a cell threshold density associated with authorized behavior in the at least one activity profile.

7. The method of claim 1, wherein the one or more limitations related to the utilization of the one or more of the plurality of IT assets comprise one or more of: a limit on a use of one or more hardware resources of the IT infrastructure; a limit on a use of one or more software resources of the IT infrastructure; a limit on a use of one or more applications hosted by the one or more of the plurality of IT assets; a limit on a use of at least portions of data hosted by the one or more of the plurality of IT assets; a limit on a distribution of data hosted by the one or more of the plurality of IT assets; a limit on a quantity of computing resources of the one or more of the plurality of IT assets that are utilized; a limit on a quantity of network resources of the one or more of the plurality of IT assets that are utilized; and a limit on a quantity of storage resources of the one or more of the plurality of IT assets that are utilized.

8. The method of claim 1, wherein the at least one automated action comprises one or more of generating one or more notifications related to the at least one activity profile; generating one or more signals related to the at least one activity profile; and controlling a performance of at least one action in one or more of the plurality of IT assets using the at least one activity profile.

9. The method of claim 1, wherein the designated restriction level is selected from a range of restriction levels for at least some of the plurality of IT assets.

10. An apparatus comprising:

at least one processing device comprising a processor coupled to a memory;

the at least one processing device being configured to implement the following steps:

monitoring a plurality of users interacting with a plurality of information technology (IT) assets of an IT infrastructure to obtain logged data;

determining at least one threshold based at least in part on a designated restriction level for at least some of the plurality of IT assets, wherein a more restrictive designated restriction level authorizes one or more of (i) a smaller population of the plurality of users, (ii) a smaller population of a plurality of resource categories associated with one or more of the plurality of IT assets, (iii) a smaller resource utilization limit of one or more resources associated with one or more of the plurality of IT assets and (iv) a smaller average utilization range of one or more resources associated with one or more of the plurality of IT assets, relative to a less restrictive designated restriction level;

processing the logged data based at least in part on a data type of the logged data to automatically generate at least one activity profile characterizing one or more limitations related to a utilization of one or more of the plurality of IT assets, wherein the one or more limitations are determined by applying the at least one threshold to at least one representation of the logged data; and initiating at least one automated action using the at least one activity profile, wherein the at least one automated action comprises automatically controlling access to at least one of the plurality of IT assets based at least in part on the at least one activity profile.

11. The apparatus of claim 10, wherein the at least one activity profile comprises at least one requester activity profile and wherein the plurality of monitored users is selected based at least in part on one or more of a user role, a user persona and a user type.

12. The apparatus of claim 10, wherein the at least one activity profile comprises at least one application activity profile and wherein the plurality of monitored users use one or more applications for a designated period of time.

13. The apparatus of claim 10, wherein the logged data comprises one or more of: (i) the plurality of resource categories related to the utilization of one or more of the plurality of IT assets and wherein an access of one or more of the plurality of resource categories that satisfy the at least one threshold is authorized in the at least one activity profile; (ii) a distribution related to a utilization of at least one resource associated with one or more of the plurality of IT assets and wherein the at least one threshold indicates a limitation of a utilization of one or more of the at least one resource associated with the one or more of the plurality of IT assets in the at least one activity profile; and (iii) one or more clusters related to first and second variables associated with one or more of the plurality of IT assets and wherein the at least one threshold indicates a cell threshold density associated with authorized behavior in the at least one activity profile.

14. The apparatus of claim 10, wherein the one or more limitations related to the utilization of the one or more of the plurality of IT assets comprise one or more of: a limit on a use of one or more hardware resources of the IT infrastructure; a limit on a use of one or more software resources of the IT infrastructure; a limit on a use of one or more applications hosted by the one or more of the plurality of IT assets; a limit on a use of at least portions of data hosted by the one or more of the plurality of IT assets; a limit on a distribution of data hosted by the one or more of the plurality of IT assets; a limit on a quantity of computing resources of the one or more of the plurality of IT assets that are utilized; a limit on a quantity of network resources of the one or more of the plurality of IT assets that are utilized; and a limit on a quantity of storage resources of the one or more of the plurality of IT assets that are utilized.

15. The apparatus of claim 10, wherein the designated restriction level is selected from a range of restriction levels for at least some of the plurality of IT assets.

16. A non-transitory processor-readable storage medium having stored therein program code of one or more software programs, wherein the program code when executed by at least one processing device causes the at least one processing device to perform the following steps:

monitoring a plurality of users interacting with a plurality of information technology (IT) assets of an IT infrastructure to obtain logged data;

determining at least one threshold based at least in part on a designated restriction level for at least some of the plurality of IT assets, wherein a more restrictive designated restriction level authorizes one or more of (i) a smaller population of the plurality of users, (ii) a smaller population of a plurality of resource categories associated with one or more of the plurality of IT assets, (iii) a smaller resource utilization limit of one or more resources associated with one or more of the plurality of IT assets and (iv) a smaller average utilization range of one or more resources associated with one or more of the plurality of IT assets, relative to a less restrictive designated restriction level;

processing the logged data based at least in part on a data type of the logged data to automatically generate at least one activity profile characterizing one or more limitations related to a utilization of one or more of the plurality of IT assets, wherein the one or more limitations are determined by applying the at least one threshold to at least one representation of the logged data; and initiating at least one automated action using the at least one activity profile, wherein the at least one automated action comprises automatically controlling access to at least one of the plurality of IT assets based at least in part on the at least one activity profile.

17. The non-transitory processor-readable storage medium of claim 16, wherein the at least one activity profile comprises one or more of: (i) at least one requester activity profile and wherein the plurality of monitored users is selected based at least in part on one or more of a user role, a user persona and a user type; and (ii) at least one application activity profile and wherein the plurality of monitored users use one or more applications for a designated period of time.

18. The non-transitory processor-readable storage medium of claim 16, wherein the logged data comprises one or more of: (i) the plurality of resource categories related to the utilization of one or more of the plurality of IT assets and wherein an access of one or more of the plurality of resource categories that satisfy the at least one threshold is authorized in the at least one activity profile; (ii) a distribution related to a utilization of at least one resource associated with one or more of the plurality of IT assets and wherein the at least one threshold indicates a limitation of a utilization of one or more of the at least one resource associated with the one or more plurality of IT assets in the at least one activity profile; and (iii) one or more clusters related to first and second variables associated with one or more of the plurality of IT assets and wherein the at least one threshold indicates a cell threshold density associated with authorized behavior in the at least one activity profile.

19. The non-transitory processor-readable storage medium of claim 16, wherein the one or more limitations related to the utilization of the one or more of the plurality of IT assets comprise one or more of: a limit on a use of one or more hardware resources of the IT infrastructure; a limit on a use of one or more software resources of the IT infrastructure; a limit on a use of one or more applications hosted by the one or more IT assets; a limit on a use of at least portions of data hosted by the one or more of the plurality of IT assets; a limit on a distribution of data hosted by the one or more of the plurality of IT assets; a limit on a quantity of computing resources of the one or more of the plurality of IT assets that are utilized; a limit on a quantity of network resources of the one or more of the plurality of IT assets that are utilized; and a limit on a quantity of storage resources of the one or more of the plurality of IT assets that are utilized.

20. The non-transitory processor-readable storage medium of claim 16, wherein the designated restriction level is selected from a range of restriction levels for at least some of the plurality of IT assets.

\* \* \* \* \*